April 25, 1961 E. T. SCHAEFER 2,981,501
DIRECTIONAL THRUST CONTROL MEANS
Filed April 4, 1957 3 Sheets-Sheet 1
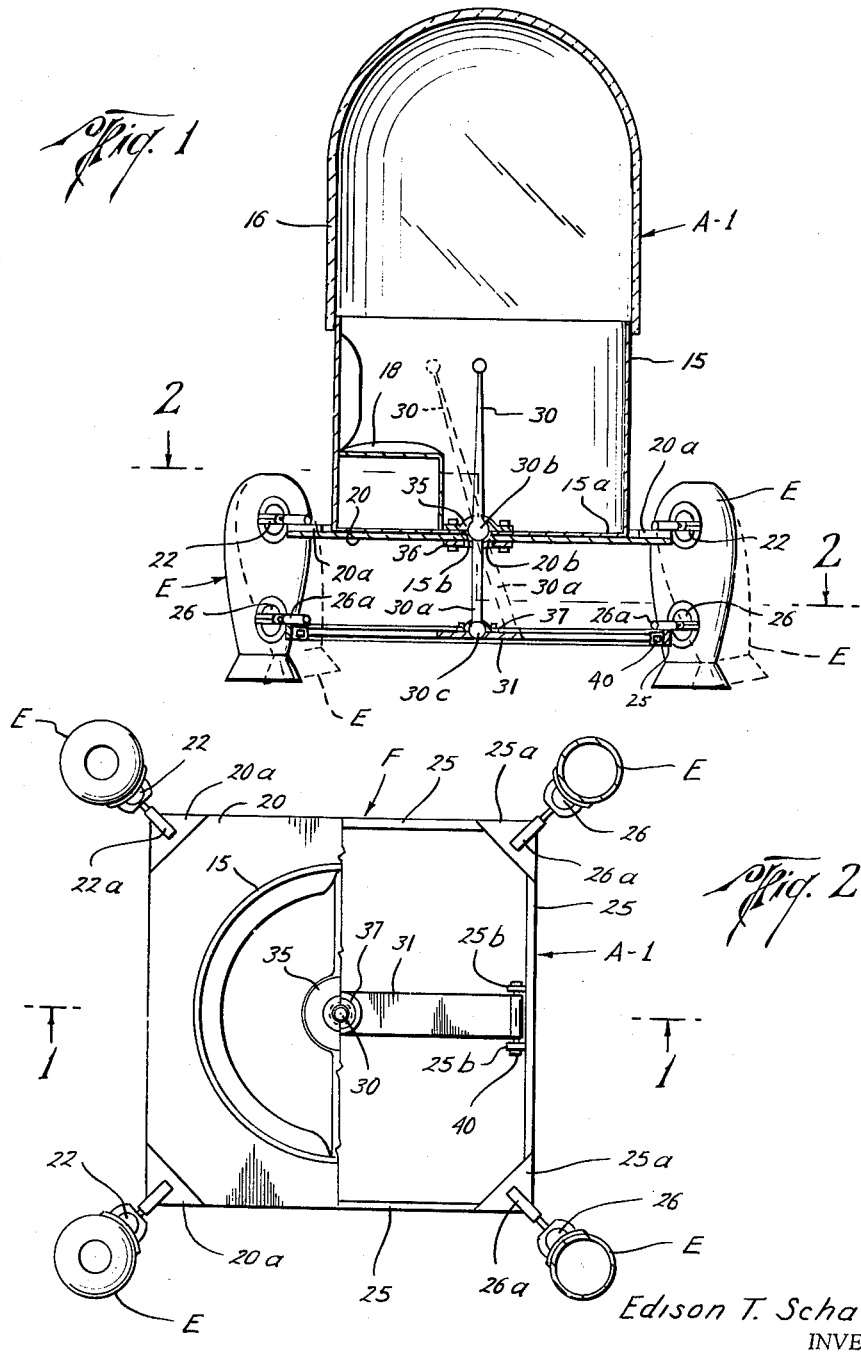
Edison T. Schaefer
INVENTOR.
BY Hayden & Pravel
ATTORNEYS

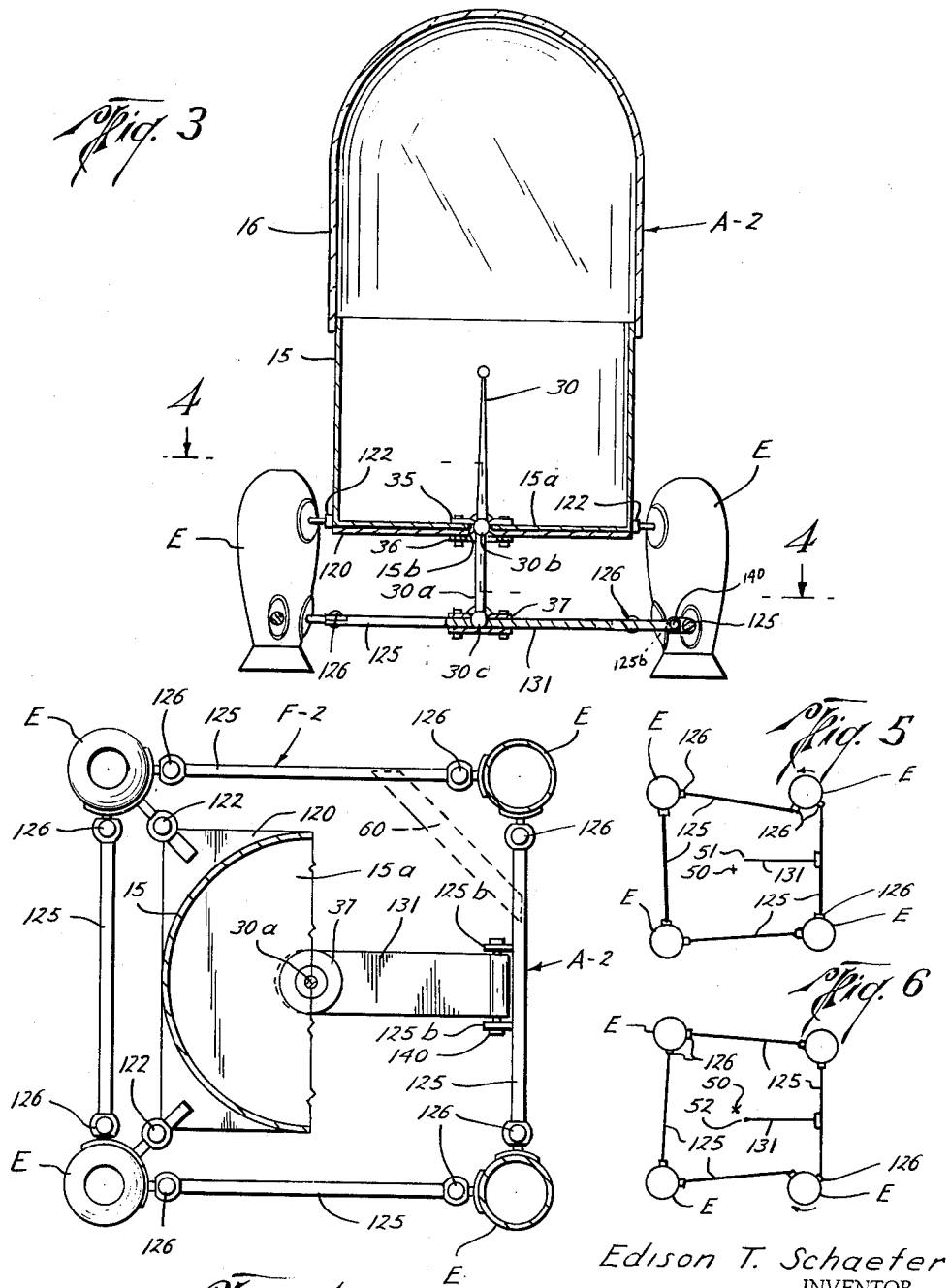

April 25, 1961 E. T. SCHAEFER 2,981,501
DIRECTIONAL THRUST CONTROL MEANS
Filed April 4, 1957 3 Sheets-Sheet 3
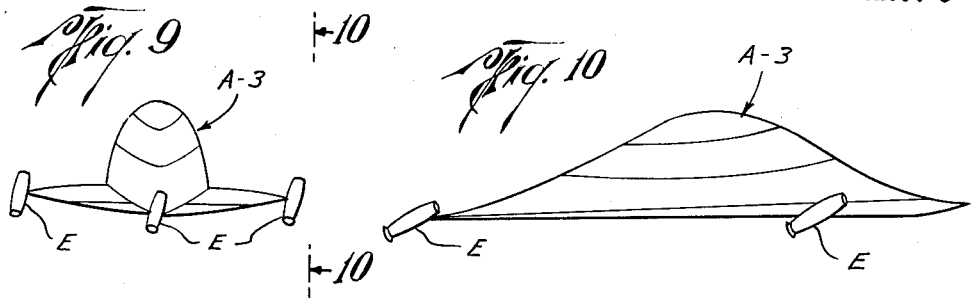
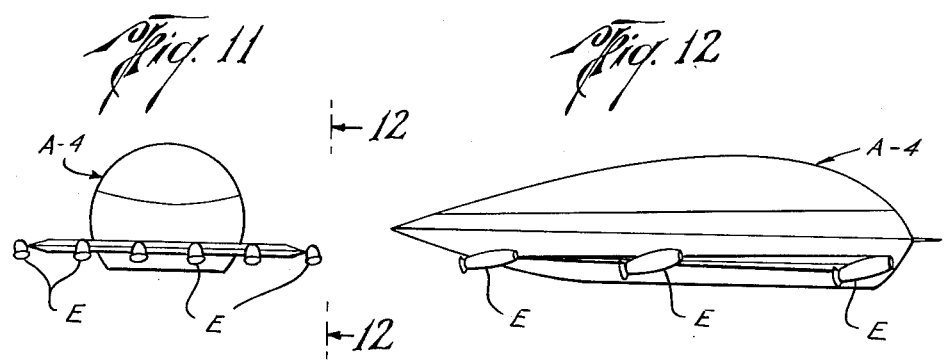
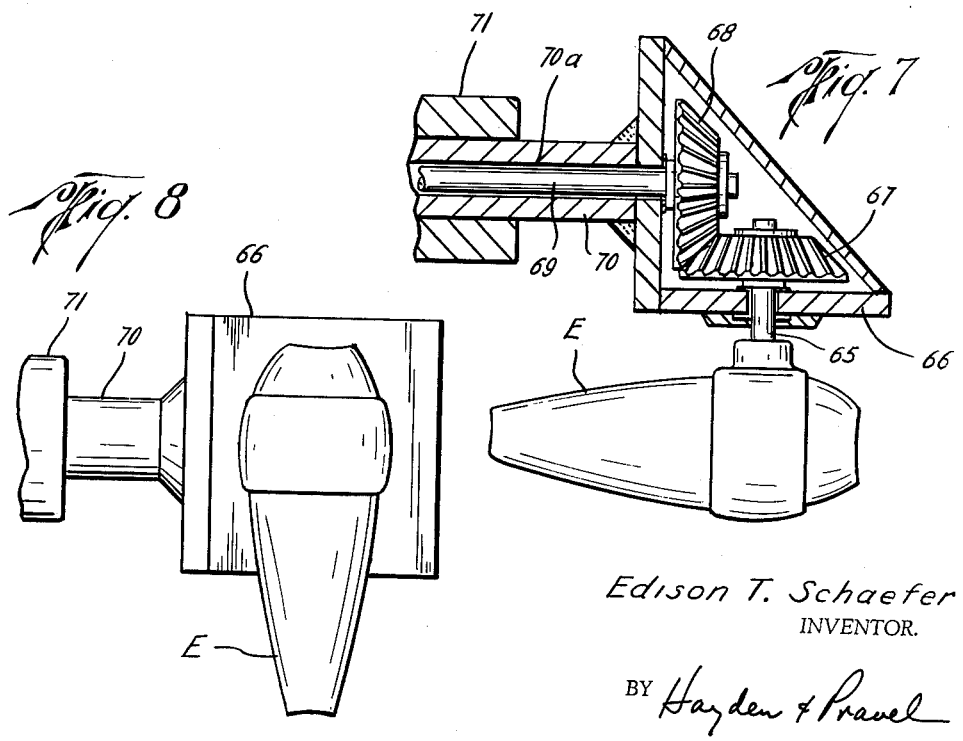
Edison T. Schaefer
INVENTOR.
BY Hayden & Pravel
ATTORNEYS

United States Patent Office 2,981,501
Patented Apr. 25, 1961

2,981,501

DIRECTIONAL THRUST CONTROL MEANS

Edison T. Schaefer, 215 Garner St., Houston, Tex.

Filed Apr. 4, 1957, Ser. No. 650,614

7 Claims. (Cl. 244—52)

This invention relates to directional thrust control means for movable objects such as air or space craft, airplanes, and the like, and is particularly concerned with mechanisms for synchronizing or partially synchronizing directional thrust engines or propulsion means such as jet engines, rocket engines or nuclear fission engines.

In the past, aircraft have generally been controlled by airfoils or surfaces of the aircraft in conjunction with other controls manually operated, but the resistance forces of air pressures on aircraft surfaces have generally controlled its maneuverability. Such control of the maneuverability limits the use of the aircraft because a large land or ship area is necessary for the aircraft to land and take-off. The helicopter has been used instead of the usual propelled or jet aircraft in instances wherein the area for landing and taking off is too limited for such aircraft. However, the helicopter also has definite limitations as to its use because its speeds are relatively low and its flying principle relies upon the application of external air pressure on its wings, rotors or airfoil surfaces.

It is therefore an object of this invention to provide means for controlling the flight of movable objects such as air or space craft, airplanes, and the like, so that such objects can be maneuvered for landing and take-off within an area which is very small as compared to the area required for the landing and take-off of known aircraft.

An important object of this invention is to provide control means for controlling directional thrust engines so as to synchronize or partially synchronize the movement of such engines for thereby controlling the flight and the maneuverability of the craft on which such engines are mounted.

Another object of this invention is to provide an apparatus for controlling the maneuverability of a movable object or craft wherein such apparatus provides for the maneuverability of the craft in such a way that there is no need to rely upon the application of air pressure on external air foils or surfaces for maneuverability.

A further object of this invention is to provide a new and improved air or space craft which has means therewith for maneuvering and controlling the flight of same with directional thrust engines.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

Fig. 1 is a view, partly in elevation and partly in section, illustrating one form of the invention;

Fig. 2 is a view, partly in section and partly in plan taken on line 2—2 of Fig. 1;

Fig. 3 is a view, partly in elevation and partly in section, illustrating another form of the invention;

Fig. 4 is a view, partly in section and partly in plan, taken on line 4—4 of Fig. 3;

Fig. 5 is a diagrammatic view to illustrate the operation of the form of the invention shown in Figs. 3 and 4;

Fig. 6 is another diagrammatic view to further illustrate the operation or functioning of the form of the invention shown in Figs. 3 and 4;

Fig. 7 is a view, partly in elevation and partly in section, illustrating another type of control means for each directional thrust engine;

Fig. 8 is a plan view of the control means and engine illustrated in Fig. 7 to show such engine in a different position;

Fig. 9 is an end view of one type of aircraft on which the control means and engines of the type shown in Figs. 7 and 8 could be mounted;

Fig. 10 is a side view of the aircraft shown in Fig. 9 taken on line 10—10 thereof;

Fig. 11 is an end view illustrating a modified aircraft with a plurality of the engines of the type shown in Figs. 7 and 8 mounted thereon; and Fig. 12 is an elevation taken on line 12—12 of Fig. 11 to illustrate the positions of such engines.

In the drawings, A-1 designates generally an aircraft or movable object capable of being moved in flight through the air. The aircraft or movable object A-1 has one or more directional thrust engines E mounted thereon. Such engines E may be any known type of jet engine, rocket engine or nuclear fission engine so long as the engine imparts a directional thrust to the aircraft or movable object A-1 with which it is connected. Briefly, each engine is mounted on the aircraft or movable object A-1 for universal movement relative thereto so that the direction of the thrust from each engine E may be controlled from the aircraft or movable object A-1. In the preferred form of the invention a plurality of the engines E are so mounted on the aircraft or movable object A-1 that they can be moved simultaneously from within the aircraft or movable object A-1. The control means for such simultaneous movement may provide for fully synchronized movement of the engine so that they all move in the same direction and to the same extent simultaneously, or such control means may provide for moving one or more of the engines a lesser amount than the other engines to cause banking of the aircraft or object A-1, as will be explained in detail hereinafter.

In the form of the invention shown in Figs. 1 and 2, the aircraft or movable object A-1 includes a body having preferably a substantially cylindrical form as indicated at 15 in Figs. 1 and 2. The upper portion 16 of the body is preferably dome-shaped and may be made of any material, but for visibility purposes, such dome 16 ordinarily is made from a transparent plastic or glass material.

Such dome 16 is connected to the lower cylindrical body portion 15 by any suitable clamping or connecting means (not shown). The base or floor 15a of the body portion 15 is connected to such cylindrical body portion 15 by welding or any other suitable connecting means. A chair or similar support 18 for one or more persons is preferably provided within the body portion 15, but it will be understood that the aircraft or object A-1 may be operated and used by a person standing on the base or floor 15a, if desired.

The base or floor 15a is positioned on a support plate 20, which as illustrated in Figs. 1 and 2, may have a square or rectangular shape. The base or floor 15a is welded or otherwise secured to such support plate 20. It may be said that the support plate 20 provides a platform for receiving the body of the aircraft or movable object A-1. It will be recognized that such support plate or platform 20 does not have to be formed of a solid sheet of metal or other material, but it may take many forms and may be reinforced as necessary for proper strength during flight and other uses.

In the form of the invention of Figs. 1 and 2, a directional thrust engine E is mounted at each corner of the square or rectangular plate 20. A triangular reinforcing plate 20a is generally welded or otherwise secured to each corner of the supporting plate or platform 20. Each of the directional thrust engines E is connected with the supporting plate or platform 20 with a universal ball joint or connection 22 having a pin 22a welded or otherwise connected to the plate 20. Although the universal ball joint or connection 22 is ordinarily used for connecting each engine E to the platform or plate 20, it should be understood that any type of connection which provides for universal movement of each engine E with respect to the platform 20 and the body of the aircraft or object A-1 thereon may be used.

For imparting simultaneous movement to the engines E about their universal joints or connections 22, all of the engines E are joined together through a control frame F having interconnecting links 25 which are welded or otherwise connected together to form a square or rectangular shape. The corners of the frame F are preferably reinforced with triangular reinforcing plates 25a which are welded or otherwise secured to the adjacent links or bars 25. A universal joint or connection 26 having a connecting pin 26a welded or otherwise secured to the frame F is ordinarily provided for connecting the lower portion of each of the engines E to the control frame F.

It is believed evident from Figs. 1 and 2 that a movement of the frame F will impart simultaneous and synchronized movement to the engines E. For controlling and manipulating the frame F relative to the platform 20, a control arm 30 which is connected to a connecting lever or member 31 is provided. The control arm or handle 30 extends into the interior of the movable object or aircraft A-1 and is so positioned that a person seated on the seat or support 18 can manipulate the control arm or handle 30 from a seated position. The control arm or handle 30 extends downwardly through an opening 15b in the floor 15a and through a similar opening 20b in the platform or plate 20 so that a lower extension 30a of the control arm 30 extends below the platform 20, but is rigidly formed or connected with the portion of the control arm extending into the interior of the body portion 15. A ball 30b may be formed on the control arm 30 for positioning in the vicinity of the openings 15b and 20b (Fig. 1) and such ball 30b serves as a ball joint or pivot point by retaining such ball 30b in position with retaining plates 35 and 36. Such mounting of the control arm 30 permits movement of the control arm 30 in any direction about the ball 30 as a pivot point, but the control arm 30 is retained against any vertical movement. In Fig. 1, the dotted line position of the control arm or handle 30 indicates one position to which the control arm 30 may be pivoted about the pivot point provided by the ball portion 30b. It can be seen from such dotted line position that the movement of the control arm 30 to the left (as viewed in Fig. 1) imparts a movement to the control arm extensions 30a in the opposite direction to the right (as viewed in Fig. 1). It will also be noted that the dotted line positions of the engine E (Fig. 1) are at substantially the same inclination or angle as the inclination or angle of the control arm 30 so that there is a definite relationship between the movement of the control arm 30 and the engines E which enables the person operating the aircraft or movable object A-1 to determine which direction the control arm should be moved to obtain a particular direction of movement of the aircraft or movable object A-1.

The lower extension 30a of the control arm 30 may be connected to the connecting levers or bars 31 through any suitable means which will permit universal movement. One type of structure which may be used is illustrated in Figs. 1 and 2, wherein the lower end of the extension of 30a has a ball portion 30c formed thereon which fits within a socket retaining plate 37 so that in effect, the lower extension 30a has a pivotal connection with the levers or bars 31. The levers or bars 31 may actually be a single lever or bar extending from one of the connecting links 25 to another of the connecting links 25 as shown in Fig. 2. Each end of such lever 31 is then preferably connected to the opposite links 25 with similar pivot bolts 40 which extend through brackets 25b which are welded or otherwise secured to their respective links 25.

The operation or use of the form of the invention illustrated in Figs. 1 and 2 is believed evident from the foregoing description. It will be understood that when the control arm 30 is in a substantially vertical position as illustrated in Fig. 1, the directional thrust engines E are also preferably in a substantially vertical position as illustrated in Fig. 1. Therefore, for the take-off, a direct upward thrust is obtained if so desired. Of course, if it is desired to take-off in an upward inclined direction, the engines E may be positioned at an angle with respect to the body of the aircraft or object A-1 such as indicated by the dotted lines for the engines E in Fig. 1. When the aircraft or movable object A-1 is in the air in flight, its direction of movement can be changed by the movement or manipulation of the control arm or handle 30. Thus, assuming the aircraft or object A-1 is thrust substantially vertically upwardly with the engines E in the position indicated by the solid lines in Fig. 1, the direction of movement of the aircraft or object A-1 can be changed by moving the control arm 30 to some other position such as indicated in dotted lines in Fig. 1. The control arm or handle may be pulled back directly towards the operator who is in a seated position on the seat 18, and in such case the frame F would be moved in a straight line to the right (as viewed in either Fig. 1, or Fig. 2). The control arm 30 may of course be moved in a diagonal direction, and it can be moved either forwardly or backwardly with respect to the operator who is seated on the seat 18. The angle or inclination of the control arm 30 will indicate to the operator the direction of movement being imparted to the aircraft or movable object A-1. It should be specifically pointed out that the extent of movement of the control arm 30 is indicated in the drawings as being limited to the normal amount of movement required for the proper manipulation of the aircraft or movable object A-1, but the extent of such movement of the control arm 30 may be varied as desired so as to obtain more movement of the engines E if such is found desirable or necessary. It will also be understood that the fuel or propellent supply to the engines E, and the controls for same, are not illustrated since various types of fuel or propellent supply means and controls could be used and they would determine the amount of thrust being imparted at any given time. Therefore, for landing and for maneuverability of the craft as desired, the amount of the thrust can be varied with such fuel or propellent supply means and controls. Thus, in landing, the amount of thrust is varied to permit the settling or lowering of the craft or object A-1 gradually, or in any manner desired.

In Figs. 3 and 4, a modified form of the invention is illustrated, wherein the craft or movable object is identified by A-2. The parts of the craft or movable object A-2, and the control means therewith, which are identical with parts in the craft or object A-1, have the same numerals in Figs. 3 and 4 as they have in Figs. 1 and 2. Thus, the body of the craft or movable object A-2 includes the cylindrical body portion 15 and the dome or dome-shaped portion 16 thereabove which is made of a transparent material for visibility purposes.

The floor or base 15a is formed with the same opening 15b therethrough, and such base or floor 15a is mounted on and welded or otherwise connected to a platform or support plate 120 which is modified as compared to the plate or platform 20 of Figs. 1 and 2 in that the platform 120 is of a reduced size since it preferably terminates at the exterior of the cylindrical body portion 15. Of course, it will be understood that the body portion 15 can be formed in any shape and could even be formed to be coextensive with the platform 20 in Figs. 1 and 2 or the platform 120 in Figs. 3 and 4. The control arm or handle 30 extends through the base 15a and the modified platform 120, but it is provided with the same ball joint 30b which is retained in position with the retaining plates 35 and 36. The lower extension 30a of the control arm 30 is likewise the same as the extension 30a in Figs. 1 and 2 and it is movable with the arm 30 thereabove as such arm pivots about the ball or pivot point 30b. The lower end of the extension 30a has the ball 30c formed thereon, and such ball is pivotally connected to a lever or bar 131 and is retained in position during such pivotal movement by a retaining plate 37.

The directional thrust engines E are each mounted on the platform 120 with universal ball joints or connections 122 which correspond with the ball joints or connections 22 of Figs. 1 and 2. Of course, as previously pointed out, any other type of connection between each engine E and the platform 120 can be utilized so long as the movement of the engine E in any direction relative to the platform 20 is permissible.

The means for imparting the movement of the control arm 30 to the directional thrust engines E to cause same to move about their universal joints or connections 122 is modified to some extent as compared to the construction shown in Figs. 1 and 2. Thus, in Figs. 3 and 4, such means for transmitting the movements of the control arm 30 include the frame F-2 which is made up of four links 125, each of which has a universal joint or connection at each end thereof, which is identified by the numeral 126 for connecting the links 125 to the engines E at two spaced points on each engine E. Such positioning of the ball joints or universal connections 126 at the circumferentially spaced points approximately 90 degrees from each other, as clearly illustrated in Fig. 4 of the drawings, provides for a desired movement which causes one or more of the engines E to move with the other engines but out of synchronization therewith to produce banking of the aircraft or movable object A-2, as will be more fully explained hereinafter. The connecting lever or bar 131 is joined to one of the links 125 with a connecting pivot bolt 140 which extends through brackets 125b which are welded or otherwise secured to the links 125.

The operation or functioning of the apparatus illustrated in Figs. 3 and 4 is similar to that described above in connection with Figs. 1 and 2, but there is one important difference in construction which enables the means illustrated in Figs. 3 and 4 to function for imparting a banking or turning movement to the aircraft or movable object A-2. Assuming that the object A-2 is in flight through the air, and that the lever or control arm 30 is moved to the left as shown in Fig. 3, such movement will impart a movement of the frame F-2 to the right (as viewed in Figs. 3 and 4). Such movement of the frame F-2 does not disturb the positions of the links 125 with respect to each other so that in effect, the square shape of the frame F-2 remains square and is simply displaced to the right (as viewed in Figs. 3 and 4). This occurs because the lever or bar 131 is connected to one of the links 125 with the pivot bolt 140 which does not permit lateral shifting of such link 125 and the lever 131 with respect to each other, and also because the direction of movement of the lever 131 is parallel to two of the other links 125 so that there is no diagonal force component acting on any of the links 125. The same type of action would occur if the lever 131 is moved to the left by moving the control arm 30 to the right (as viewed in Fig. 3), except of course that the frame F-2 would move with the lever 131 to the left instead of to the right as described above.

In order to illustrate other movements of the control arm 30 to impart a turning and banking thrust force to the aircraft or movable object A-2, the illustrations or diagrams of Figs. 5 and 6 are included in the drawings. In Fig. 5 the numeral 50 designates the central spot at which the pivot ball or member 30c is normally located when the control arm 30 is in the substantially vertical position shown in Fig. 3. The point or spot marked 51 in the Fig. 5 is the point to which such pivot ball or member 30c has been moved by a manipulation or movement of the control arm 30. As the pivot ball or member 30c is moved from the point 50 to the point 51, the lever or bar 131 is moved therewith, and since the link 125 is directly connected with the lever 131, it also moves and remains perpendicular to the lever 131. Since the means connecting the links 125 with the engines E are universal joints or connections, it can be seen that as the link 125 at the right in Fig. 5 is moved to the right and upwardly (as viewed in Fig. 5), such link 125 at the right will tend to move the universal joint 126 connecting such link 125 to the engine E in the upper right hand corner in a direction around and to the right of such engine E. In other words, there will be a definite movement of the universal joint 126 which is between the engine E at the upper right hand corner of Fig. 5 and the link 125 at the right in Fig. 5, and such movement will occur as the ball member 30c is moved in passing from the point 50 to the point 51. In other words, there is a turning action imparted to such upper right hand corner engine E in a counter-clockwise direction when the ball or member 30c is moved from the point 50 to the point 51 as shown in Fig. 5. There would be no appreciable turning or rotational movement of any of the other engines E since the links 125 connected therewith merely follow with the link 125 which is connected to the lever 131. Therefore, the amount of inclination of the control arm 30 would be substantially directly transmitted to all of the engines E except for the engine E at the upper right hand corner (Fig. 5). Due to the fact that such upper right-hand engine E was rotated as it was moved with the other engines E, it was not moved to as great an inclination as the other engines. Therefore, the engine E at the upper right hand corner will be acting in a more nearly downward or vertical direction than the other three engines E, which will create a couple or torque force which will turn or bank the aircraft or movable object A-2.

In order to obtain the opposite direction of banking or turning, the control arm 30 is moved as indicated in Fig. 6 so that the ball or member 30c at the lower end of the control arm 30 is moved from its position at the point 50 to a position at a point 52 which would be downwardly and to the right as viewed in Fig. 6. Such movement of the control arm 30 imparts a movement to the lever 131 so as to move same and also the link 125 at the extreme right in Fig. 6 in a direction which is downwardly and to the right (as viewed in Fig. 6). It is believed evident from the previous description in connection with Fig. 5 that such movement of the lever 131 imparts a rotational movement to the engine E which is at the lower right hand corner in Fig. 6 so as to cause same to turn in a rotational direction which is substantially clockwise, and therefore the engine E at the lower right hand corner will move a lesser amount than the other three engines E and will therefore have a smaller inclination with respect to a downward or vertical direction than the other three engines E. Again, such difference in the direction of the thrust from the engines imparts a turning or banking movement to the aircraft or movable object A-2. Although the above description of the movements of the engines E with the particular construction illustrated in Figs. 3–6 would certainly not include every movement possible with such a construction, the numerous variations in the movements will be evident from such exemplary description. It should also be noted that if it is desired to operate the construction of Figs. 3 and 4 so that all of the engines E move together in a synchronized movement, that is, all the engines E move to the same inclination or angle simultaneously, an additional connecting member 60 (shown in dotted lines in Fig. 4) may be connected between two of the adjacent links 125 so that the links 125 remain as a square frame regardless of their position of movement by the control arm 30. Such connecting member 60 may of course be connected with bolts or any other suitable securing means (not shown), and it may be releasably connected so that the form of the invention may be selectively operated with or without the member 60.

In Figs. 7 and 8, a modified control means is illustrated for use with one or more directional thrust engines E. Each directional thrust engine E is mounted on a rotatable shaft 65 which extends into a gear housing 66. The shaft 65 has a bevel gear 67 connected thereto and disposed within the gear housing 66. The bevel gear 67 meshes with a coacting bevel gear 68 which is also in the gear housing 66 and which has a drive shaft 69 connected therewith and which extends from the gear housing 66 at a right angle to the shaft 65. The drive shaft 69 is positioned within the bore 70a of an external hollow drive shaft 70 which is welded or otherwise connected to the gear housing 66. Both of the shafts 69 and 70 extend into the body 71 of an aircraft or other movable object. The shafts 69 and 70 may be operated simultaneously or independently by either manual or electrical controls from within the aircraft or other movable object to which the engine E is connected. The extent of the universal movement possible with the construction illustrated in Figs. 7 and 8 is believed evident from the comparison of the two positions shown in Figs. 7 and 8. Thus, in Fig. 7, the engine E is shown in a position discharging to the left and with the engine E below the gear housing 66. In Fig. 8, the engine E has been turned to discharge at approximately 90 degrees to the direction of discharge in Fig. 7 and also, the engine E is positioned above the gear housing 66. Thus, it is believed evident that the engine E as shown in Figs. 7 and 8 may be turned with the gears 67 and 68 throughout 360 degrees in one plane. By rotating the hollow drive shaft 70, the entire gear housing 66 may be rotated throughout 360 degrees in a plane perpendicular to the plane of rotation of the shaft 65, so that it is possible to move the engine E to any positione desired.

In order to make it clear that the invention herein is not limited to any particular type of aircraft, several modified aircraft forms are shown in Figs. 9–12. The aircraft or movable object A–3 illustrated in Figs. 9 and 10 of the drawings has a plurality of the engines E mounted thereon for universal movement. Preferably, there are three of such engines E, and each engine E is mounted as explained in connection with Figs. 7 and 8 of the drawings. It will be understood that the engines E may be controlled from within the aircraft A–3 by suitable mechanisms, including but not limited to, mechanical, electrical, hydraulic, pneumatic, and electronic controls. Likewise, in Figs. 11 and 12 another type of aircraft or movable object A–4 is illustrated, which has a differently shaped body and wherein a greater number of the engines E are preferably employed. Each of such engines E would against be mounted in a manner similar to that explained in connection with Figs. 7 and 8 so that each engine E would be capable of universal movement for changing the direction of thrust therefrom. It will also be appreciated that the structure of this invention, including the form of the invention shown in Figs. 7 and 8 and the several forms of the invention shown in Figs. 1–4, could be mounted in connection with conventional aircraft using propellers so that the directional thrust engines would be usable for maneuvering the aircraft during the landing and takeoff to reduce the area required for such landing and takeoff. On the other hand, the propeller driven aircraft could conserve fuel during long range flight by the use of the propellers either alone or in conjunction with the directional thrust engines. Also, it is conceivable that the aircraft or movable object could take the form of present day automobiles or even boats or any other movable object, whether it had wings or airfoil surfaces or not, since each of the engines E could function without the use of airfoil surfaces or wings.

It is understood that the devices of this invention may be used in media other than air, such as space. Further, it should be clearly understood that the gears 67 and 68 may be replaced with a flexible drive shaft, cable, cams, pulleys or any other mechanism for transmitting the motion from a member such as the shaft 69 to the engine E shown in Figs. 7 and 8.

The foregoing disclosure and description of the invention is illustrative and explanatory thereof and various changes in the size, shape and materials, as well as in the details of the illustrated construction, may be within the scope of the appended claims without departing from the spirit of the invention.

What is claimed is:

1. An apparatus for controlling the flight of a movable object, comprising a movable object, a plurality of directional thrust propulsion devices, means for mounting each propulsion device on said movable object for movement in a 360° path, link members forming a closed loop with said propulsion devices and extending between each of the adjacent propulsion devices, universal connection joints connecting the link members to the propulsion devices, means for moving said link members in a substantially planar path for simultaneously changing the position of each of said propulsion devices within each 360° path to control the direction of movement of said movable object, said plurality of directional thrust engines including at least four directional thrust engines, and said universal connection joints including a pair of spaced universal joints mounted on each engine.

2. A movable object adapted to be moved in flight through the air or other media, comprising a body in which one or more persons are adapted to be positioned, a first directional thrust propulsion device, connection means connecting said first propulsion device to said body at one point for universal movement relative to said body, a pair of links each having one end thereof connected to said first propulsion device for universal movement relative thereto, means for imparting movement to said first propulsion device relative to said body by moving said links while maintaining the connection between said first propulsion device and said body by said connection means for thereby changing the position of said propulsion device with respect to said body, second and third directional thrust propulsion devices, the other end of one of said links being connected with said second propulsion device for universal movement relative thereto, the other end of the other of said second pair of links being connected with said third propulsion device for universal movement relative thereto, and means for imparting simultaneous movement to all of said propulsion devices by imparting simultaneous movement to all of said links.

3. The structure set forth in claim 2, wherein said last-mentioned means includes a control arm, means pivotally mounting said arm on said body, and additional means pivotally mounting said arm to one of said links.

4. The structure set forth in claim 2, including means for preventing said propulsion devices from shifting relative to each other as they are moved simultaneously together.

5. An apparatus for controlling the flight of a movable object, comprising a movable object, at least three directional thrust propulsion devices, a first universal connection means for mounting each propulsion device on said movable object for movement in a 360° path, link members forming a closed loop with said propulsion devices and extending between each of the adjacent propulsion devices, a pair of universal connection joints on each propulsion device in addition to said first universal connection means connecting the link members to the propulsion devices, and means for moving said link members in a substantially planar path for simultaneously changing the position of each of said propulsion devices within each 360° path to control the direction of movement of said movable object.

6. An apparatus for controlling the flight of a movable object, comprising a movable object, at least three directional thrust propulsion devices mounted on said movable object, a first swivel means for mounting each of said propulsion devices for discharging the thrust exhaust therefrom downwardly in a direction away from said movable object and for permitting movement of each propulsion device in a 360° path about said swivel means, link members forming a closed loop with said propulsion devices and extending between each of the adjacent propulsion devices, additional swivel means on each propulsion device and longitudinally spaced from said first swivel means connecting each link member to the adjacent propulsion devices for enabling said propulsion devices to be shifted about said first swivel means of each propulsion device to change the angle of inclination of each propulsion device with respect to the vertical, a single control means operably connected to said link means and said propulsion devices for moving said link members to effect a movement of each device to different angles of inclination in any position within said 360° path, and means for maintaining said devices parallel to each other for each position of said devices whereby the movement of said propulsion devices is synchronized to control the direction of movement of said movable object.

7. An apparatus for controlling the flight of a movable object, comprising a movable object, at least three directional thrust propulsion devices mounted for 360° movement on said movable object, link members forming a closed loop with said propulsion devices and extending between each of the adjacent propulsion devices, a pair of universal connection joints on each propulsion device connecting the link members to the propulsion devices, control means for simultaneously moving said link members to simultaneously move all of said propulsion devices with respect to said movable object, and means for automatically and simultaneously changing the angle of inclination of one of said propulsion devices with respect to the angle of inclination of the other propulsion devices and while maintaining the other propulsion devices substantially parallel to each other upon a movement of said control means, whereby a turning or banking force on said movable object is obtained.

References Cited in the file of this patent

UNITED STATES PATENTS

| | | |
|---|---|---|
| 842,505 | Unsinger | Jan. 29, 1907 |
| 1,113,741 | Benscoter | Oct. 13, 1914 |
| 1,134,790 | White | Apr. 6, 1915 |
| 2,939,654 | Coanda | June 7, 1960 |

FOREIGN PATENTS

| | | |
|---|---|---|
| 160,981 | Australia | Feb. 8, 1955 |